(12) United States Patent
Bernhardt et al.

(10) Patent No.: US 7,251,639 B2
(45) Date of Patent: Jul. 31, 2007

(54) SYSTEM AND METHOD FOR FEATURE SELECTION IN DECISION TREES

(75) Inventors: Jeffrey R. Bernhardt, Woodinville, WA (US); Pyungchul Kim, Snoqualmie, WA (US); C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 10/185,663

(22) Filed: Jun. 27, 2002

(65) Prior Publication Data

US 2004/0002879 A1    Jan. 1, 2004

(51) Int. Cl.
*G06F 17/00* (2006.01)
(52) U.S. Cl. ............................................ 706/45
(58) Field of Classification Search .................. 706/14, 706/12, 925, 45
See application file for complete search history.

(56) References Cited

U.S. PATENT DOCUMENTS

| | | | | |
|---|---|---|---|---|
| 4,852,173 A * | 7/1989 | Bahl et al. | ................... | 704/240 |
| 4,872,122 A * | 10/1989 | Altschuler et al. | ........... | 356/432 |
| 6,101,275 A * | 8/2000 | Coppersmith et al. | ...... | 382/226 |
| 6,269,353 B1 * | 7/2001 | Sethi et al. | ..................... | 706/20 |
| 6,317,735 B1 * | 11/2001 | Morimoto | ....................... | 707/2 |
| 6,442,561 B1 * | 8/2002 | Gehrke et al. | ............... | 707/102 |
| 6,643,660 B1 * | 11/2003 | Miller et al. | ................. | 707/100 |
| 6,889,219 B2 * | 5/2005 | Epstein et al. | ................. | 706/45 |
| 6,941,287 B1 * | 9/2005 | Vaidyanathan et al. | ........ | 706/12 |
| 6,944,329 B2 * | 9/2005 | Yoshii | .......................... | 385/159 |
| 6,963,870 B2 * | 11/2005 | Heckerman | .................... | 707/5 |
| 7,003,490 B1 * | 2/2006 | Keyes | ........................... | 705/38 |

OTHER PUBLICATIONS

Almuallim, H. et al., "Development and Applications of Decision Trees", *Expert Systems*, 2002, vol. 1, 53-77.
Fayyad, U.M. et al., "The Attribute selection problem in decision tree generation", *Proceedings of the 10th National Conference on Artificial Intelligence*, 1992, Cambridge MA, 104-110.
Giles, K. et al., "Comparasion of Two Families of Entropy-Based Classification Measures with and without Feature Selection", *34th Annual Hawaii International Conference on System Sciences (HICSS-34)* 2001, vol. 3, 3014.

* cited by examiner

*Primary Examiner*—Anthony Knight
*Assistant Examiner*—Adrian Kennedy
(74) *Attorney, Agent, or Firm*—Woodcock Washburn LLP

(57) ABSTRACT

Selection of certain attributes as output and input attributes is provided so a decision tree may be created more efficiently. For each possible output attribute an interestingness score is calculated. This interestingness score is based on entropy of the output attribute and a desirable entropy constant. The attributes with the highest interestingness score are used as output attributes in the creation of the decision tree. Score gains for the input attribute over the output attributes are calculated using a conventional scoring algorithm. The sum of the score gains over all output attributes for each input attribute is calculated. The attributes with the highest score gain sums are used as input attributes in the creation of the decision tree.

46 Claims, 5 Drawing Sheets

SYSTEM AND METHOD FOR FEATURE SELECTION IN DECISION TREES

FIELD OF THE INVENTION

The present invention relates to systems and methods for selecting features to use either input attributes or output attributes in training a decision tree. More specifically, the present invention relates to a maximum interestingness score for calculating the relative usefulness of features as output attributes to a decision tree. The present invention also relates to a maximum split score for calculating the relative usefulness of features as input attributes to a decision tree.

BACKGROUND OF THE INVENTION

Data mining is the exploration and analysis of large quantities of data, in order to discover correlations, patterns, and trends in the data. Data mining may also be used to create models that can be used to predict future data or classify existing data.

For example, a business may amass a large collection of information about its customers. This information may include purchasing information and any other information available to the business about the customer. The predictions of a model associated with customer data may be used, for example, to control customer attrition, to perform credit-risk management, to detect fraud, or to make decisions on marketing.

To create and test a data mining model such as a decision tree, available data may be divided into two parts. One part, the training data set, may be used to create models. The rest of the data, the testing data set, may be used to test the model, and thereby determine the performance of the model in making predictions. Data within data sets is grouped into cases. For example, with customer data, each case corresponds to a different customer. All data in the case describes or is otherwise associated with that customer.

One type of predictive model is the decision tree. Decision trees are used to classify cases with specified input attributes in terms of an output attribute. Once a decision tree is created, it can be used predict the output attribute of a given case based on the input attributes of that case.

Decisions trees are composed of nodes and leaves. One node is the root node. Each node has an associated attribute test that splits cases that reach that node to one of the children of the node based on an input attribute. The tree can be used to predict a new case by starting at the root node and tracing a path down the tree to a leaf, using the input attributes of the new case in the attribute tests in each node. The path taken by a case corresponds to a conjunction of attribute tests in the nodes. The leaf contains the decision tree's prediction for the output attribute(s) based on the input attributes.

An exemplary decision tree is shown in FIG. 1. In this decision tree, or example, if a decision tree is being used to predict a customer's credit risk, input attributes may include debt level, employment, and age, and the output attribute is a prediction of what the credit risk for the customer is. As shown in FIG. 1, decision tree 200 consists of root node 210, node 212, and leaves 220, 222 and 224. The input attributes are debt level and type of employment, and the output attribute is credit risk. Each node has associated with it a split constraint based on one of the input attributes. For example, the split constraint of root node 210 is whether debt level is high or low. Cases where the value of the debt input attribute is "high" will be transferred to leaf 224 and all other cases will be transferred to node 212. Because leaf 224 is a leaf, it gives the prediction the decision tree model will give if a case reaches leaf 224. For decision tree 200, all cases with a "high" value for the debt input attribute will have credit risk output attribute assigned to "bad" with a 100% probability. The decision tree 200 in FIG. 1 predicts only one output attribute, however more than one output attribute may be predicted with a single decision tree.

While the decision tree may be displayed and stored in a decision tree data structure, it may also be stored in other ways, for example, as a set of rules, one for each leaf node, containing a conjunction of the attribute tests.

Input attributes and output attributes do not have to be binary attributes, with two possible states. Attributes can have many states. In some decision tree creation contexts, attribute tests must be binary. Binary attribute tests divide data into two groups—one group of data that meets a specific test, and one group of data that does not. Therefore for an attribute with many states (e.g. a color variable with possible states {red, green, blue, violet}) a binary attribute test must be based on the selection of one of the states. Such an attribute test may therefore ask whether, for input attribute color, is the value of that attribute the state "red" and data at the node will be split into data for which the value of the attribute is "red" in one child, and data for which the value of the attribute is not "red" in another child.

In order to create the tree, the nodes, attribute tests, and leaf values must be decided upon. Generally, creating a tree is an inductive process. Given an existing tree, all testing data is processed by the tree, starting with the root node, divided according to the attribute test to nodes below, until a leaf is reached. The data at each leaf is then examined to determine whether and how a split should be performed, creating a node with an attribute test leading to two leaf nodes in place of the leaf node. This is done until the data at each node is sufficiently homogenous. In order to begin the induction the root node is treated as a leaf.

To determine whether a split should be performed, a score gain is calculated for each possible attribute test that might be assigned to the node. This score gain corresponds to the usefulness of using that attribute test to split the data at that node. There are many ways to determine which attribute test to use using the score gain. For example, the decision tree may be built by using the attribute test that reduces the amount of entropy at the node. Entropy is a measure of the homogeneity of the data. The data at the node must be split into two groups of data which each are heterogeneous from each other based on the output attribute for which the tree is being generated.

In order to determine what the usefulness is of splitting the data at the node with a specific attribute test, the resultant split of the data at the node for each output attribute must be computed. This correlation data is used to determine a score which is used to select an attribute test for the node. Where the input attribute being considered is gender, for example, and the output attribute is car color, the data from the following Table 1 must be computed for the testing data that reaches the node being split:

TABLE 1

| Correlation Count Table | | |
|---|---|---|
| | gender = MALE | gender ≠ MALE |
| car color = RED | 359 | 503 |
| car color ≠ RED | 4903 | 3210 |

As described above, data in a correlation count table such as that shown in Table 1 must be calculated for each combination of a possible input attribute test and output attribute description. Because of the multiplicity of correlation count table calculations required, the more attributes considered, the higher the requirements in memory space and processing time to calculate these correlation count tables. One way of handling this problem is to select certain features to be used for input and output attributes. In the prior art, where this is done at all, it is done by selecting the input attributes with highest entropy for use in the decision tree. However, this yields poor results in terms of quality of prediction. Output attribute selection was only done by use of a user-supplied hierarchy, which yields no definite prediction quality gains and, indeed, often creates a worse prediction quality, since grouping attributes with different behavior negatively affects decision tree quality.

Thus, there is a need for a technique to allow the selection of output attributes and input attributes in such a way as to narrow the number of attributes used in training the decision tree while simultaneously selecting attributes for use which yield efficient and useful decision trees.

SUMMARY OF THE INVENTION

In view of the foregoing, the present invention provides systems and methods for using selecting input attributes and output attributes for use in training a decision tree. Output attributes are chosen based on a maximum interestingness score method, where the interestingness score is based on the entropy of the attribute and a most favored interestingness score. A predetermined number of attributes with the highest interestingness scores are selected for use in decision tree training. In another embodiment all output attributes with interestingness scores above a certain level are selected for use in decision tree training.

Input attributes are chosen by calculating score gain sums for each input attribute. This score gain is based on the split scores and node scores of the input and output attributes. A predetermined number of input attributes with the highest score gain sum are selected for use in decision tree training. In another embodiment, all input attributes with score gain sums above a certain level are selected for use in decision tree training.

BRIEF DESCRIPTION OF THE DRAWINGS

The system and methods for selecting input and output attributes in decision trees in accordance with the present invention are further described with reference to the accompanying drawings in which.

DETAILED DESCRIPTION OF THE INVENTION

Overview

As described in the background, the selection of input attributes for use in decision tree creation from the set of all possible input attributes and the selection of output attributes for use in decision tree creation from the set of all possible output attributes, when it is done, is often haphazard or done in a way which does not maximize the utility of the resulting decision tree.

In order to select output attributes for use in decision tree creation, an "interestingness" score is calculated for each possible output attribute, and the attributes selected are those with the highest interestingness scores. In order to select input attributes for use in decision tree creation, a score gain sum is calculated for each possible input attribute (taking into account the output attributes) and the attributes selected are those with the highest score gain sums.

As output attribute selection is independent of input attributes, the output attribute selection is performed first in one embodiment of the invention. Because input attribute selection is dependent on output attributes, the reduced number of output attributes will result in increased space and processing time efficiency.

Exemplary Computing Environment

Figure 1:
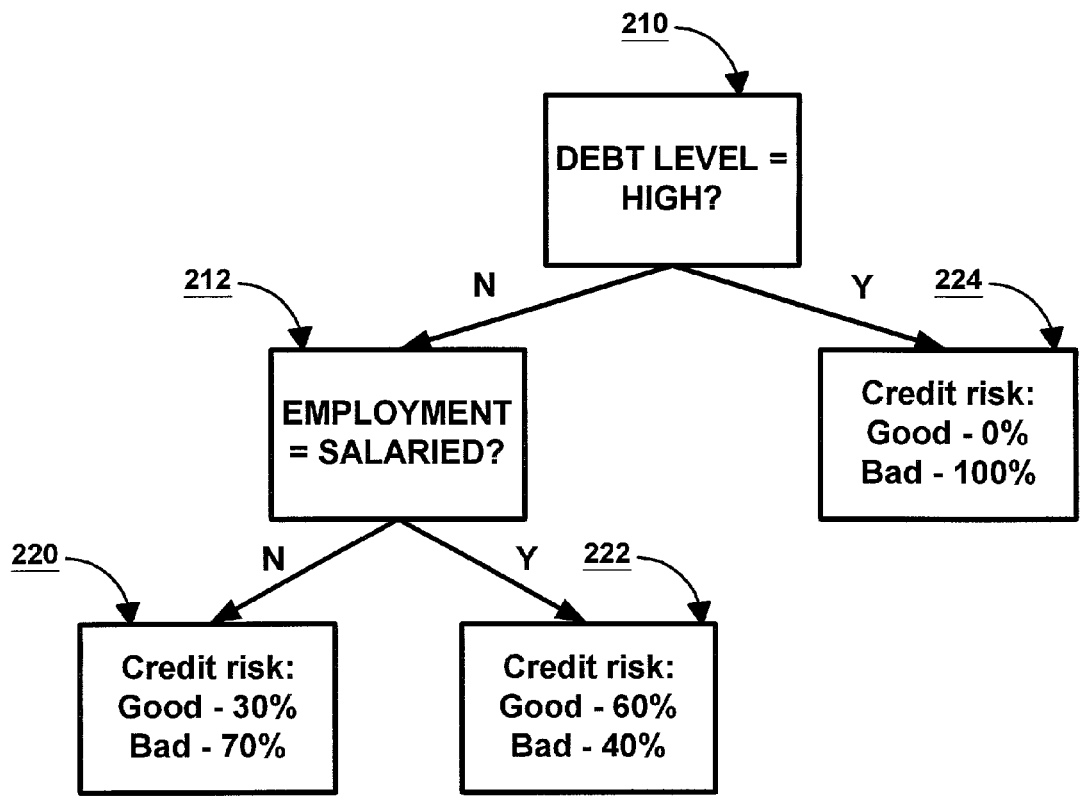
FIG. 1 is a block diagram depicting an exemplary decision tree.
Figure 2:
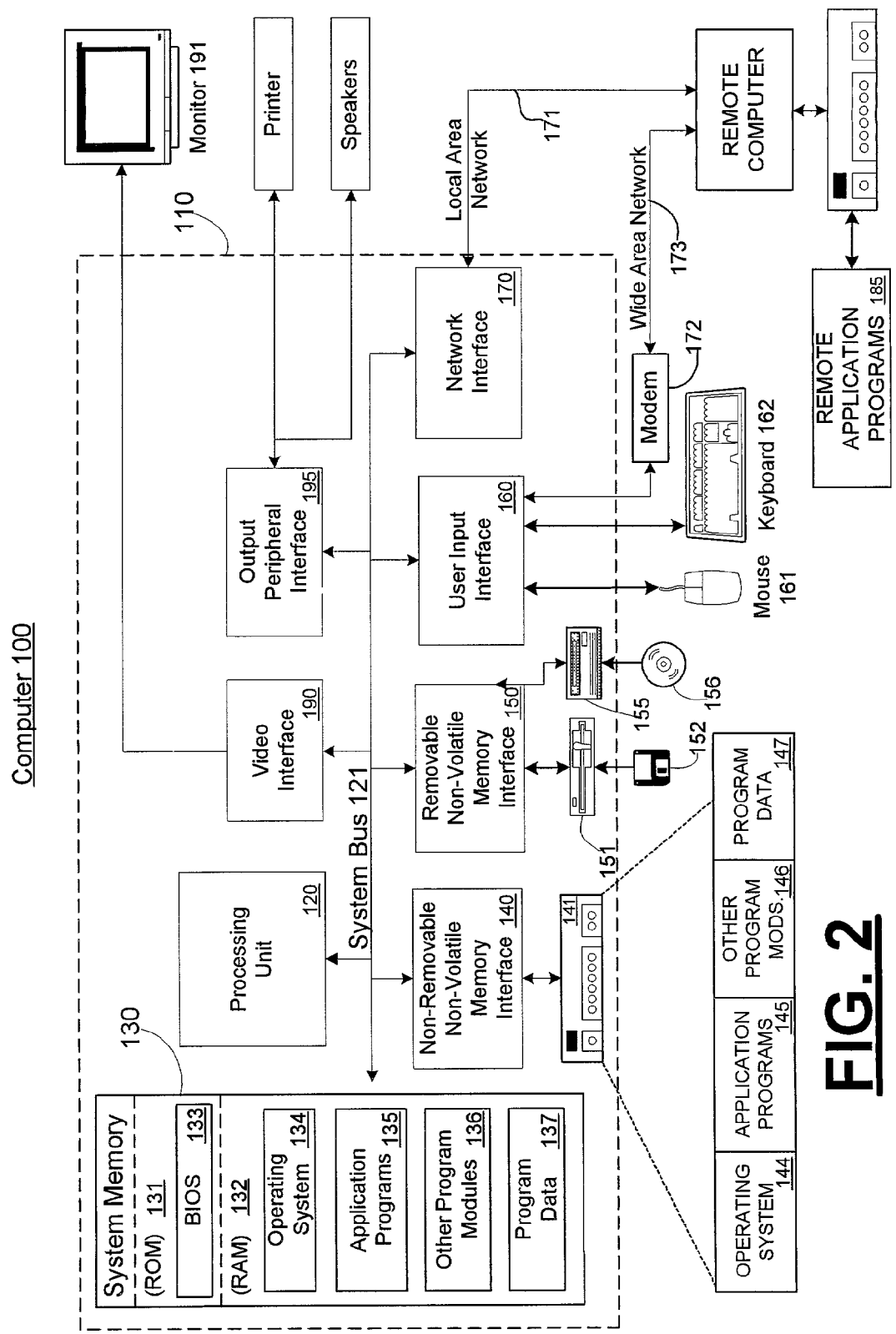
FIG. 2 is a block diagram of an exemplary computing environment in which aspects of the invention may be implemented.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Feature Selection of Output Attributes

The entropy of an attribute is a measure of the diversity of an attribute over a data set. To determine which attributes contain useful information for use in a decision tree, the use of entropy has some appeal. High entropy for an output state has some desirability. If an attribute has low entropy, with many cases in the data set having the same value for the attribute, then the homogeneity of data sets, even after splitting, may be high. This yields uninteresting predictions, and it is less likely that a split will uncover a useful distinction for a low entropy output attribute.

However, consider the case of an output attribute with 100,000 states corresponding to the possible 5-digit zip codes. Although there are likely to be many cases with certain of the most popular states, there is also likely to be high entropy. Predicting such an output attribute, though, would yield a decision tree with many layers, likely one which is inefficient to produce and inefficient to use.

The "interestingness" of an output attribute is a measure of how useful the attribute is in a decision tree. Two observations about interestingness may be made. First, the more skewed the attribute, the less interesting the attribute will be. If all most all cases have a certain state as the value of the attribute, this is less interesting or useful to predict. Second, the more diverse the attribute is, the less the attribute is interesting. Predicting customer phone numbers is likely to be costly in processing time and memory space, and likely to result in low performance.

In one embodiment of the invention, in order to determine the interestingness of an attribute, the entropy of the attribute should be considered as well as a most favored entropy value. The difference between the actual entropy and most favored entropy is used to determine interestingness. In a preferred embodiment, the interestingness IS(A) of an attribute A is given in equation (1):

$$IS(A) = -(m - E(A))^2 \tag{1}$$

where E(A) is the entropy of the attribute A, and where m is a most favored entropy value. Entropy may be calculated in a number of ways. One equation for entropy is given in equation (2):

$$E(A) = \sum_{i=1}^{n} (p_i * \ln(p_i)) \tag{2}$$

where $p_i$ is the marginal probability of state i (of the n possible states) in attribute A in the data set being considered. This entropy equation is used in one embodiment of the invention, however it is contemplated that any entropy equation may be used. In other words, $p_i$ corresponds to the proportion of state i examples in the set. The most favored entropy value m in equation (1) may be set before feature selection has begun, or it may be a parameter which can be set dynamically or by the user during the feature selection process. One possible value for m is the maximum entropy value for an attribute with 10 states, that is, $1n(10)$.

Figure 3:
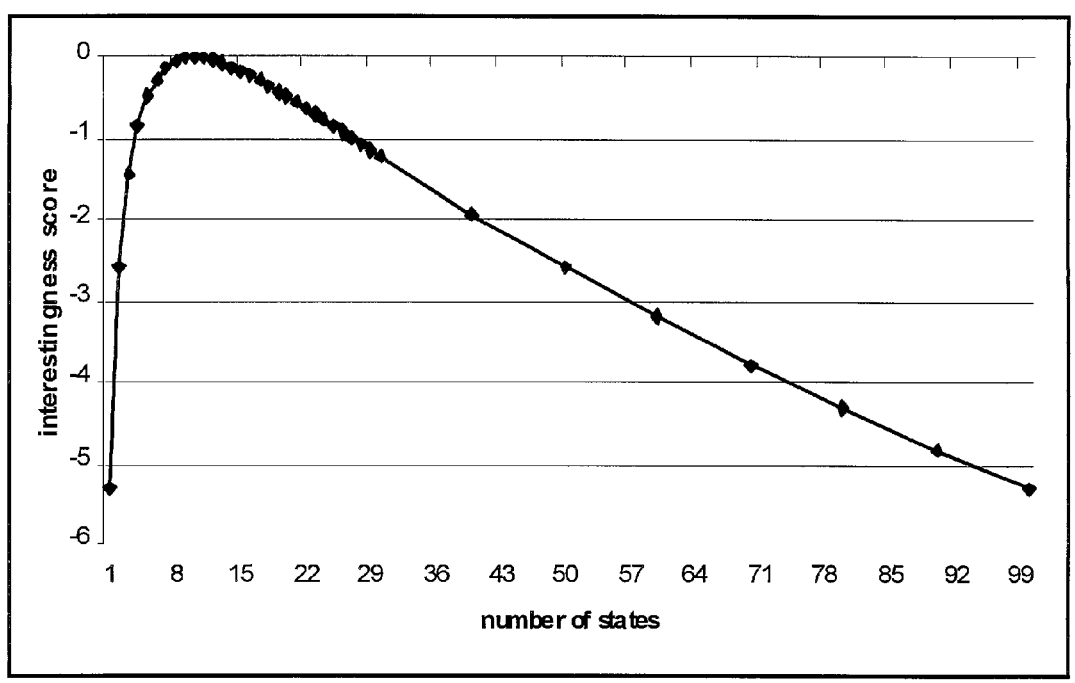
FIG. 3 is a graph of the interestingness scores of data sets with maximum entropy over an attribute with a certain number of states according to one embodiment of the present invention.

By using this interestingness score rather than entropy, both entropy and the number of states in the attribute are taken into account. In FIG. 3, a graph is provided which shows the interestingness scores (Y-axis) of attributes with maximum entropy (even distribution over all states) for attributes with N states (X-axis). As can be seen from this graph, interestingness scores range between approximately −5.5 and 0, with an attribute with 10 states and maximum entropy scoring the maximum possible score of 0.

When the interestingness score is created for each of possible output attribute, according to one embodiment of the invention, the K attributes with the highest interestingness scores are selected for use in the decision tree creation process. K may be set before feature selection has begun, or it may be a parameter that can be set dynamically or by the user during the feature selection process. In an alternate embodiment of the invention, all attributes with an interestingness score above a certain value are selected for use in the decision tree creation process.

Feature Selection of Input Attributes

According to the present invention, selecting input attributes for use in creating a decision tree from among a set of possible input attributes is done by calculating a gain score sum for each input attribute. This gain score sum is based on the input attribute and all output attributes. On the other hand, as described, output attribute selection is independent of input attributes. Therefore, output attributes should be selected first, to lower the number of output attributes considered in input attribute selection and to prevent output attributes which are not selected from influencing the calculation of input attributes.

A gain score G(O,I) for an input attribute I over an output attribute O is calculated according to equation (3):

$$G(O,I) = \text{Splitscore}(O,I) - \text{Nodescore}(O) \tag{3}$$

where Splitscore (O,I) is the measure of the effect on output attribute O of a split over a data set based on input attribute I, and where Nodescore (O) is a measure of the score of a node before a split. The entire training set is used to determine the Splitscore and the Nodescore. Both Splitscore and Nodescore may be based on any scoring means. Existing scoring functions include Bayesian score and K2 score, but any scoring means which provides a score for a split and a node may be used.

The score gain sum for an attribute I is the sum of the gain scores over all output attributes, as shown in equation (4):

$$\sum_{j=1}^{n} G(O_j, I) \quad (4)$$

where $O_j$ is the j-th output attribute of n total output attributes. This score gain sum will represent a measure of the effect of the input attribute on the output attributes.

When the score gain sum is created for each of possible input attribute, according to one embodiment of the invention, the J attributes with the highest score gain sum are selected for use in the decision tree creation process. J may be set before feature selection has begun, or it may be a parameter that can be set dynamically or by the user during the feature selection process. In an alternate embodiment of the invention, all attributes with a score gain sum above a certain value are selected for use in the decision tree creation process.

In an alternate embodiment of the invention, only a certain reduced number of output attributes are used in calculating the score gain sums for the input attributes. This reduced number of output attributes may be selected randomly, based on entropy, based on number of states, or based on the interestingness score of the output attributes.

Feature Selection Process for Selecting Both Output and Input Attributes

Figure 4:
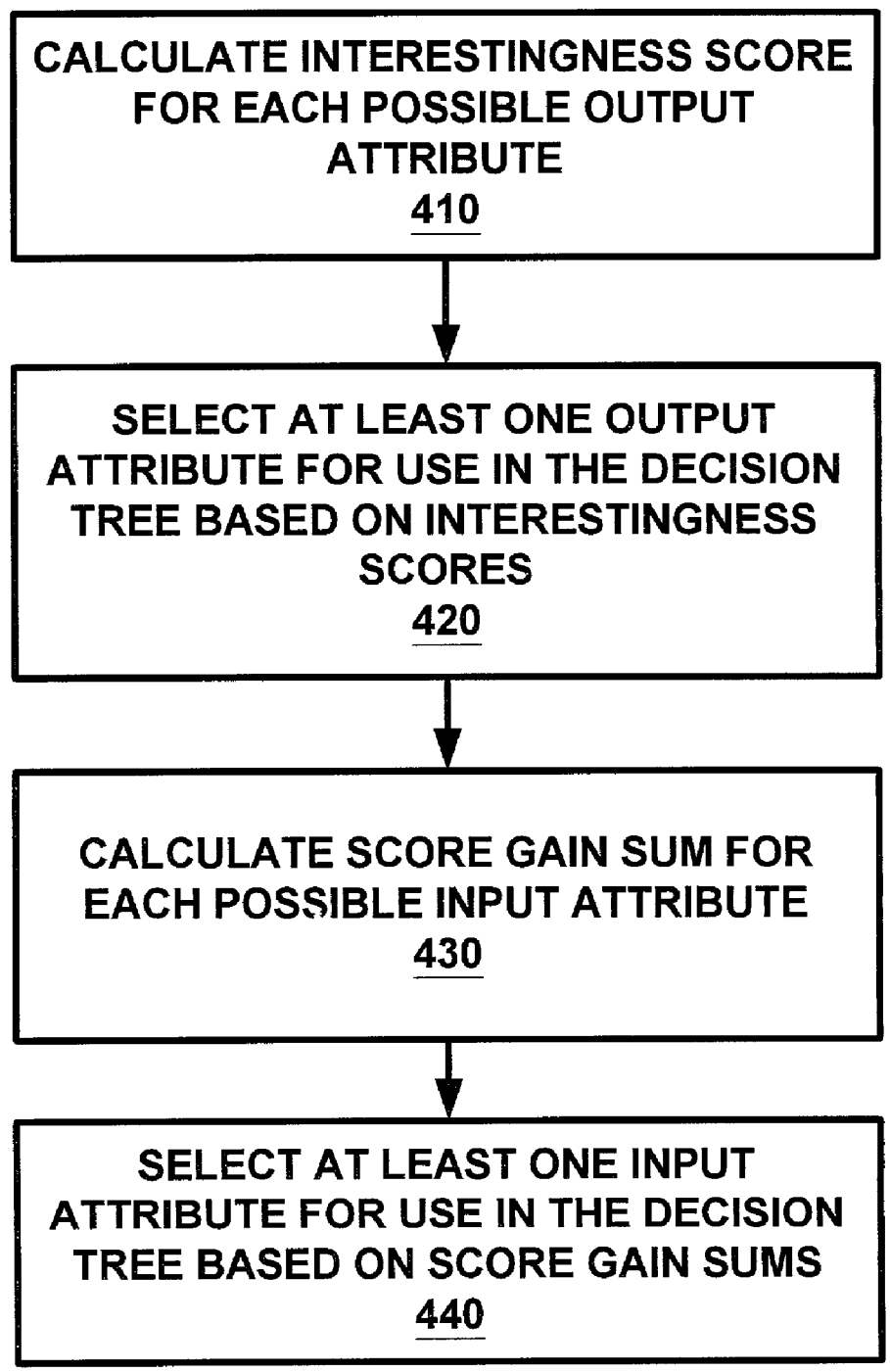
FIG. 4 is a block diagram of the technique for selection of input and output attributes according to the invention.

As shown in FIG. 4, the feature selection process can be used for both input and output attributes. When this occurs, the interestingness score is calculated for each output attribute as shown in step 410. In one embodiment, this is done according to the formula in equation (1) above. Next, at least one output attribute is selected for use in the decision tree based on the interestingness scores 420.

Next, in step 430, a score gain sum is calculated for each input attribute using the output attributes that had been selected in the previous step. In one embodiment, this is done using the formula in equation (4) above. And, finally, in step 440, at least one input attribute is selected for use in the decision tree based on the score gain sums. In this way, the technique for the selection of output attributes (steps 410 and 420) can be concatenated with the technique for the selection of input attributes (steps 430 and 440).

System For Selecting Output and Input Attributes

Figure 5:
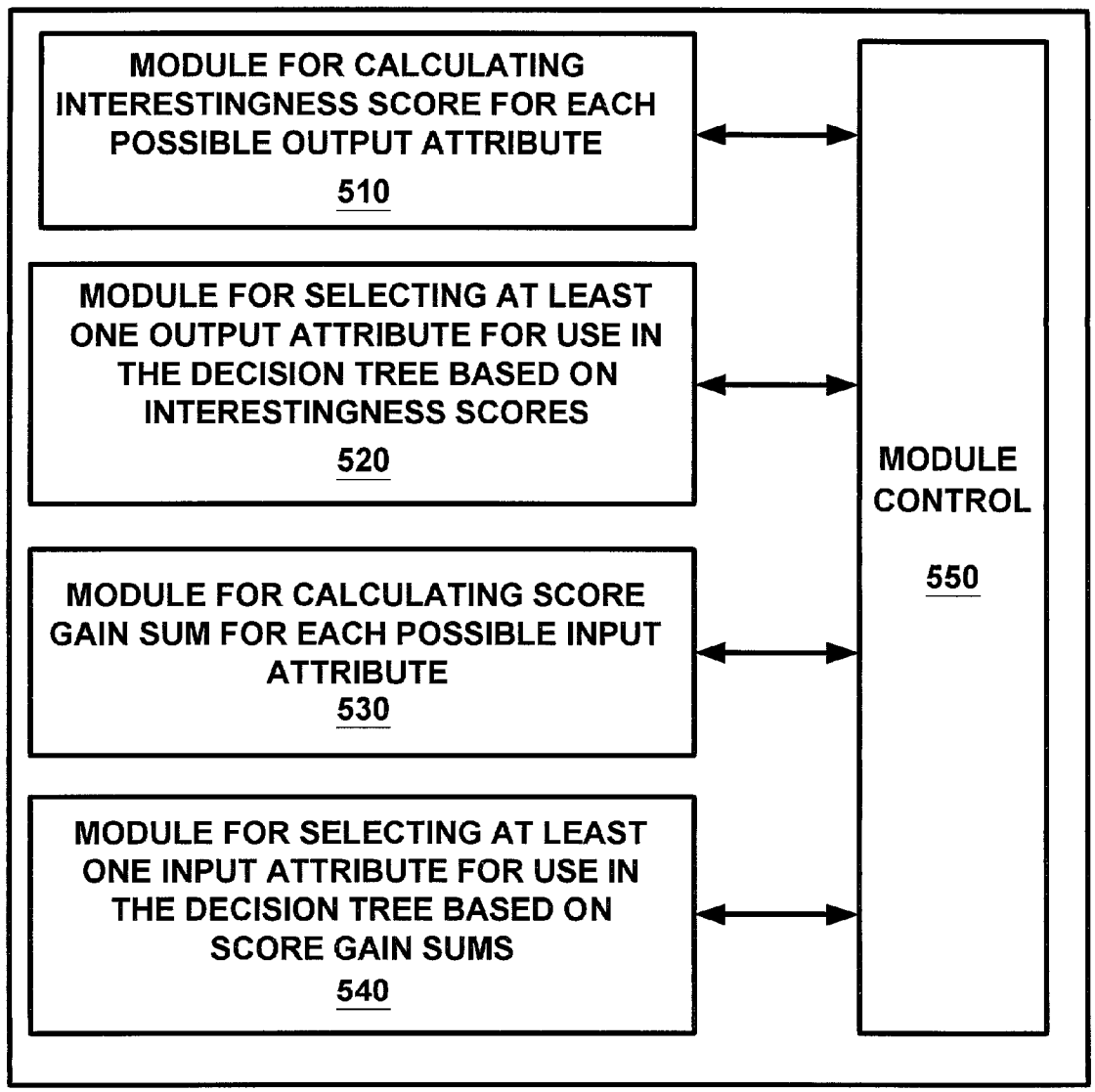
FIG. 5 is a block diagram of a system according to the invention.

As shown in FIG. 5, the feature selection system includes a module for calculating the interestingness score of output attributes 510, a module for selecting the output attributes for use 520, a module for calculating a score gain sum is calculated for each input attribute 530, and a module for selecting input attributes 540. In a preferred embodiment, these modules are used with a control module 550 which manages the selection process.

CONCLUSION

Herein a system and method for selecting certain attributes as output and input attributes in creating a decision tree. Limiting the number of attributes used lessens memory space and processing time requirements. Selecting the attributes to use intelligently can lead to an increased utility of the resulting tree over other possible reduced-attribute decision trees.

For each possible output attribute an interestingness score is calculated. This interestingness score, based on entropy of the output attribute and a desirable entropy constant, measures the possible in order to avoid very diverse attributes which may have high entropy but are difficult to predict. The attributes with the highest interestingness score are used as output attributes in the creation of the decision tree.

The invention also contemplates a technique for selecting input attributes. Score gains for the input attribute over the output attributes are calculated using a conventional scoring algorithm. The sum of the score gains over all output attributes for each input attribute is calculated. This score is a measure of the effect of the input attribute on the output attributes. The attributes with the highest score gain sums are used as input attributes in the creation of the decision tree.

As mentioned above, while exemplary embodiments of the present invention have been described in connection with various computing devices and network architectures, the underlying concepts may be applied to any computing device or system in which it is desirable to create a decision tree. Thus, the techniques for creating a decision tree in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for selecting output attributes for use in a decision tree from a set of possible output attributes comprising:
   determining an interestingness score for each output attribute based on the difference between the entropy of the output attribute E(A) and a most favored entropy value m; and
   selecting at least one output attribute for use in said decision tree from said set of possible output attributes based on said interestingness scores.

2. A method according to claim 1, where said determination of an interestingness score for each output attribute comprises:
   determining an interestingness score equivalent to $-(m-E(A))^2$.

3. A method according to claim 1, where said most favored entropy value m is set by the user.

4. A method according to claim 1, where said most favorite entropy value m is dynamically chosen while performing said method.

5. A method according to claim 1, where said selection of at least one output attribute for use in said decision tree from said set of possible output attributes based on said interestingness scores comprises:
   selecting the K output attributes with the highest interestingness scores for use in said decision trees.

6. A method according to claim 5, where said selection of at least one output attribute for use in said decision tree from said set of possible output attributes based on said interestingness scores further comprises:
   sorting the output attributes by interestingness score.

7. A method according to claim 5, where the value of K is set by the user.

8. A method according to claim 5, where the value of K is dynamically chosen while performing said method.

9. A method according to claim 1, where said selection of at least one output attribute for use in said decision tree from said set of possible output attributes based on said interestingness scores comprises:
   selecting the output attributes with interestingness score greater than a minimum interestingness value for use in said decision tree.

10. A method according to claim 9, where the value of said minimum interestingness value is set by the user.

11. A method according to claim 9, where the value of said minimum interestingness value is dynamically chosen while performing said method.

12. A method for selecting output attributes for use in a decision tree from a set of possible output attributes and for selecting input attributes for use in said decision tree from a set of possible input attributes comprising:
   determining an interestingness score for each output attribute based on the difference between the entropy of the output attribute E(A) and a most favored entropy value m;
   selecting at least one output attribute for use in said decision tree from said set of possible output attributes based on said interestingness scores;
   determining a score gain sum for each input attribute based on the sum of gain scores over all of said selected at least one output attribute for use in said decision tree; and
   selecting at least one input attribute for use in said decision tree from said set of possible input attributes based on said score gain sums.

13. A method according to claim 12, where said determination of an interestingness score for each output attribute comprises:
   determining an interestingness score equivalent to $-(m-E(A))^2$.

14. A method according to claim 12, where said selection of at least one output attribute for use in said decision tree from said set of possible output attributes based on said interestingness scores comprises:
   selecting the K output attributes with the highest interestingness scores for use in said decision trees.

15. A method according to claim 12, where said selection of at least one output attribute for use in said decision tree from said set of possible output attributes based on said interestingness scores comprises:
   selecting the output attributes with interestingness score greater than a minimum interestingness value for use in said decision tree.

16. A method according to claim 12, where gain score of an input attribute over an output attribute is equal to the split score of said input attribute and said output attribute minus the node score of said input attribute over the training data.

17. A method according to claim 12, where said selection of at least one input attribute for use in said decision tree from said set of possible input attributes based on said score gain sums comprises:
   selecting the J output attributes with the highest score gain sums for use in said decision trees.

18. A method according to claim 17, where said selection of at least one input attribute for use in said decision tree from said set of possible input attributes based on said interestingness scores comprises:
   sorting the input attributes by score gain sum.

19. A method according to claim 17, where the value of J is set by the user.

20. A method according to claim 17, where the value of J is dynamically chosen while performing said method.

21. A method according to claim 12, where said selection of at least one input attribute for use in said decision tree from said set of possible input attributes based on said interestingness scores comprises:
  selecting the input attributes with score gain sums greater than a minimum score gain sum for use in said decision tree.

22. A method according to claim 21, where the value of said minimum score gain sum is set by the user.

23. A method according to claim 21, where the value of said minimum score gain sum is dynamically chosen while performing said method.

24. A method for selecting input attributes for use in said decision tree from a set of possible input attributes comprising:
  determining a score gain sum for each input attribute based on the sum of gain scores over all output attributes for use in said decision tree; and
  selecting at least one input attribute for use in said decision tree from said set of possible input attributes based on said score gain sums.

25. A method according to claim 24, where gain score of an input attribute over an output attribute is equal to the split score of said input attribute and said output attribute minus the node score of said input attribute over the training data.

26. A method according to claim 24, where said selection of at least one input attribute for use in said decision tree from said set of possible input attributes based on said score gain sums comprises:
  selecting the J output attributes with the highest score gain sums for use in said decision trees.

27. A method according to claim 26, where said selection of at least one input attribute for use in said decision tree from said set of possible input attributes based on said interestingness scores comprises:
  sorting the input attributes by score gain sum.

28. A method according to claim 26, where the value of j is set by the user.

29. A method according to claim 26, where the value of J is dynamically chosen while performing said method.

30. A method according to claim 24, where said selection of at least one input attribute for use in said decision tree from said set of possible input attributes based on said interestingness scores comprises:
  selecting the input attributes with score gain sums greater than a minimum score gain sum for use in said decision tree.

31. A method according to claim 30, where the value of said minimum score gain sum is set by the user.

32. A method according to claim 30, where the value of said minimum score gain sum is dynamically chosen while performing said method.

33. A computer-readable storage medium comprising computer-executable modules having computer-executable instructions for selecting output attributes for use in a decision tree from a set of possible output attributes and for selecting input attributes for use in said decision tree from a set of possible input attributes, said modules comprising:
  a module for determining an interestingness score for each output attribute based on the difference between the entropy of the output attribute E(A) and a most favored entropy value m;
  a module for selecting at least one output attribute for use in said decision tree from said set of possible output attributes based on said interestingness scores;
  a module for determining a score gain sum for each input attribute based on the sum of gain scores over all of said selected at least one output attribute for use in said decision tree; and
  a module for selecting at least one input attribute for use in said decision tree from said set of possible input attributes based on said score gain sums.

34. A computer-readable storage medium according to claim 33, where said module for determining an interestingness score for each output attribute comprises:
  a module for determining an interestingness score equivalent to $-(m-E(A))^2$.

35. A computer-readable storage medium according to claim 33, where said module for selecting at least one output attribute for use in said decision tree from said set of possible output attributes based on said interestingness scores comprises:
  a module for selecting the K output attributes with the highest interestingness scores for use in said decision trees.

36. A computer-readable storage medium according to claim 33, where said module for selecting at least one output attribute for use in said decision tree from said set of possible output attributes based on said interestingness scores comprises:
  a module for selecting the output attributes with interestingness score greater than a minimum interestingness value for use in said decision tree.

37. A computer-readable storage medium according to claim 33, where gain score of an input attribute over an output attribute is equal to the split score of said input attribute and said output attribute minus the node score of said input attribute over the training data.

38. A computer-readable storage medium according to claim 33, where said module for selecting at least one input attribute for use in said decision tree from said set of possible input attributes based on said score gain sums comprises:
  a module for selecting the J output attributes with the highest score gain sums for use in said decision trees.

39. A computer-readable storage medium according to claim 33, where said module for selecting at least one input attribute for use in said decision tree from said set of possible input attributes based on said interestingness scores comprises:
  a module for selecting the input attributes with score gain sums greater than a minimum score gain sum for use in said decision tree.

40. A computer device for selecting output attributes for use in a decision tree from a set of possible output attributes and for selecting input attributes for use in said decision tree from a set of possible input attributes, comprising:
  means for determining an interestingness score for each output attribute based on the difference between the entropy of the output attribute E(A,) and a most favored entropy value m;
  means for selecting at least one output attribute for use in said decision tree from said set of possible output attributes based on said interestingness scores;
  means for determining a score gain sum for each input attribute based on the sum of gain scores over all of said selected at least one output attribute for use in said decision tree; and means for selecting at least one input attribute for use in said decision tree from said set of possible input attributes based on said score gain sums.

41. A computer device according to claim 40, where said means for determining an interestingness score for each output attribute comprise:

means for determining an interestingness score equivalent to $-(m-E(A))^2$.

42. A computer device according to claim 40, where said means for selecting at least one output attribute for use in said decision tree from said set of possible output attributes based on said interestingness scores comprise:

means for selecting the K output attributes with the highest interestingness scores for use in said decision trees.

43. A computer device according to claim 40, where said means for selecting at least one output attribute for use in said decision tree from said set of possible output attributes based on said interestingness scores comprise:

means for selecting the output attributes with interestingness score greater than a minimum interestingness value for use in said decision tree.

44. A computer device according to claim 40, where gain score of an input attribute over an output attribute is equal to the split score of said input attribute and said output attribute minus the node score of said input attribute over the training data.

45. A computer device according to claim 40, where said means for selecting at least one input attribute for use in said decision tree from said set of possible input attributes based on said score gain sums comprise:

means for selecting the J output attributes with the highest score gain sums for use in said decision trees.

46. A computer device according to claim 40, where said means for selecting at least one input attribute for use in said decision tree from said set of possible input attributes based on said interestingness scores comprise:

means for selecting the input attributes with score gain sums greater than a minimum score gain sum for use in said decision tree.

* * * * *